United States Patent

[11] 3,623,766

[72] Inventor Joseph G. Funk
 General Delivery, Ewing, Nebr. 68735
[21] Appl. No. 77,181
[22] Filed Oct. 1, 1970
[45] Patented Nov. 30, 1971

[54] PORTABLE FISHING CHAIR
 7 Claims, 4 Drawing Figs.
[52] U.S. Cl. .................................................. 297/188,
 297/217
[51] Int. Cl. ...................................................... A47c 7/62
[50] Field of Search ............................................ 297/188,
 194, 217, 135, 437, 367, 366, 369, 354; 248/46,
 48, 44, 39, 166, 168

[56] References Cited
 UNITED STATES PATENTS
 981,631 1/1911 Fraser ......................... 297/188 X

| | | | |
|---|---|---|---|
| 2,555,073 | 5/1951 | Zdankoski | 297/188 X |
| 2,607,398 | 8/1952 | Andrews | 297/217 X |
| 2,909,215 | 10/1959 | Mitchell | 297/188 X |
| 2,982,338 | 5/1961 | Ernst | 297/217 |

Primary Examiner—James T. McCall

ABSTRACT: A convenient chair for use by a fisherman while fishing in wading waters so that the fisherman may rest his feet, the device comprising a frame of generally A-shaped configuration and comprised of a pair of legs pivotable so to spread apart the lower ends thereof, one of the legs supporting an adjustable seat, the other leg supporting an adjustable footrest and an adjustable tray, the apex of the frame including several holders into which the handle end of the fishing rod may be inserted so to free the fisherman's hands.

PATENTED NOV 30 1971
3,623,766
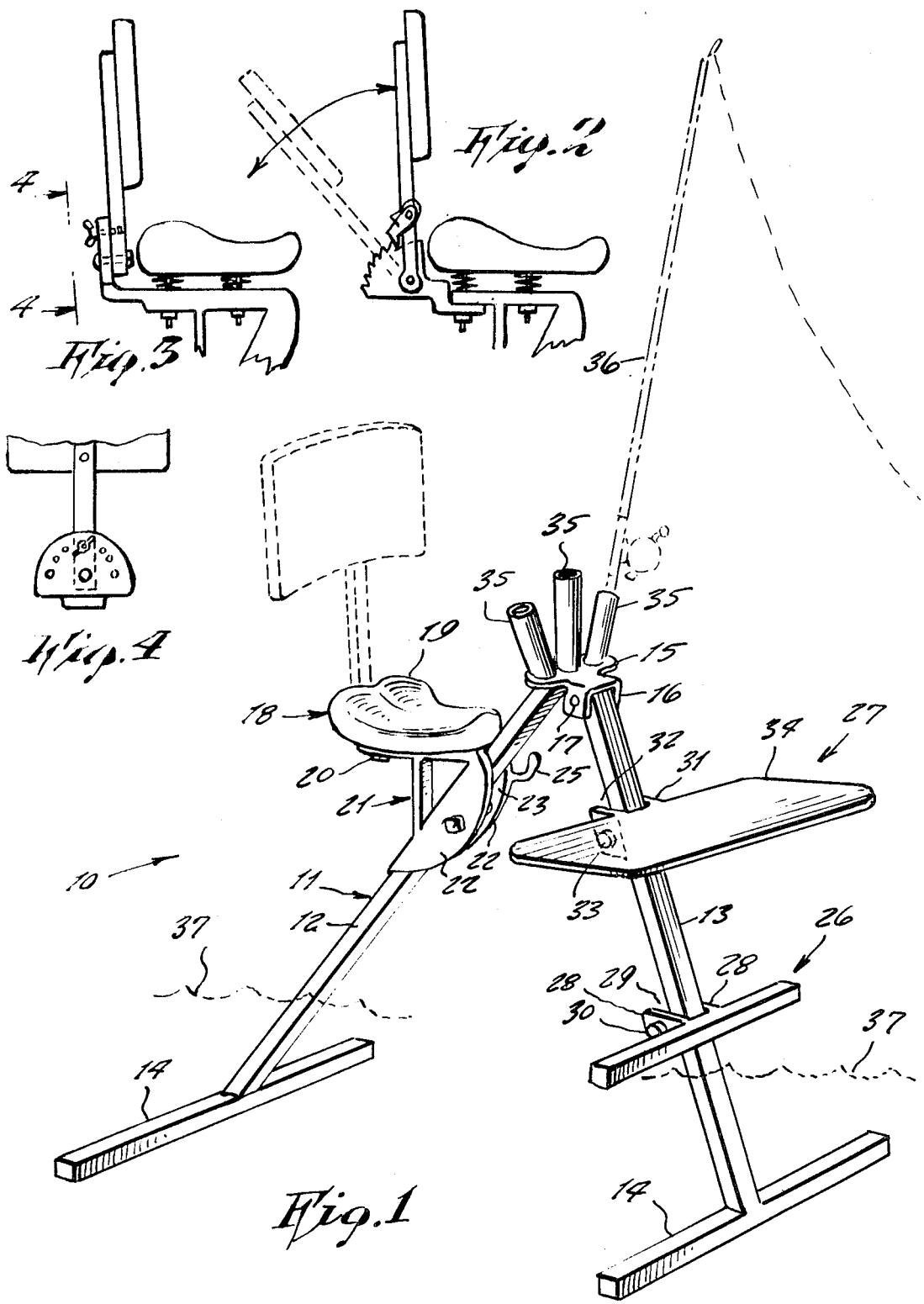
INVENTOR
JOSEPH G. FUNK

PORTABLE FISHING CHAIR

This invention relates generally to fishing equipment. More specifically the present invention relates to fishing equipment such as is used by sports fishermen.

It is generally well known that a fisherman after fishing long hours can become tired on his feet. Particularly when the fisherman is standing in wading waters and there may be no convenient rock upon which he may seat himself. This situation is accordingly in want of improvement.

Accordingly it is the principal purpose of the present invention to provide a fishing chair which can be used by a fisherman while he is fishing in wading waters.

Another purpose of the present invention is to provide a fishing chair which is readily portable so that the fisherman can transport it to the fishing area.

Still another purpose of the present invention is to provide a fishing chair which is readily collapsible so that it may be folded up and conveniently fitted into an automotive vehicle for transportation between a fisherman's home and a fishing ground.

Other objects of the present invention are to provide a portable fishing chair which is simple in design, inexpensive to manufacture, rugged in construction, easy to use and efficient in operation.

These and other objects will be readily evident upon a study of the following specification and the accompanying drawing wherein:

FIG. 1 is a perspective view of the present invention shown in wading waters.

FIG. 2 is a side view of one form of chair seat and backrest.

FIG. 3 is a side view of a modified design thereof.

FIG. 4 is a fragmentary view in direction 4—4 of FIG. 3.

Referring now to the drawing in detail, the reference numeral 10 represents a portable fishing chair according to the present invention wherein there is a frame 11 of A-configuration, the frame 11 including a pair of downwardly diverging legs 12 and 13, each of which may be made of aluminum tubing of square cross-sectional configuration. The lower ends of each of the legs 12 and 13 have a horizontally extending foot 14 rigidly affixed thereto each foot being made likewise of aluminum tubing of square cross-sectional configuration.

At the upper end of the leg 12 there is rigidly affixed thereto a stationary bracket 15, the bracket 15 having a pair of downwardly extending ears 16 through which a pin 17 is fitted, the pin 17 supporting pivotally free the upper end of the leg 13. Thus the legs 12 and 13 may be pivoted together or spread apart, as desired.

Upon the rear leg 12 there is adjustably attached a seat unit 18 which includes a cushioned seat 19 attached by means of bolts 20 or the like to a bracket 21 which includes a pair of spaced-apart flanges 22 with a channel 23 therebetween for receiving the leg 12, the flanges being slightly flexible so that they may be forcibly brought together by means of a transverse bolt 24 extending therethrough and thus rigidly affixing the position of the seat unit at a selected elevation along the leg 12.

One of the flanges of the bracket may be provided with an integral hook 25 which is conveniently located to the fisherman resting upon the seat which can be used as a fishing stringer from which the fisherman's catch can be suspended.

Upon the front leg 13 there is adjustably secured a leg rest 26 and a tray 27. The leg rest 26 has a pair of parallel spaced-apart ears 28 so to form a channel 29 therebetween into which is fitted the leg 13, the ears 28 being slightly flexed toward each other by means of a transverse extending bolt 30 therethrough thus adjustably clamping the leg rest to the leg 13. The tray 27 likewise includes a pair of parallel spaced-apart ears 31, forms a channel therebetween and within which the leg 13 is positioned.

The ears 31 are slightly flexed so that a bolt 33 extending therethrough permit the ears to clamp rigidly against opposite sides of the legs 13 and thus adjustably locate the tray in a selected position, for a fisherman perched upon the seat.

The tray 27 also includes a flat panel 34 of sufficient length and breadth so that the fisherman may place thereupon any desired object. Such objects may include the fisherman's tackle box, reading material or food, as desired.

The footrest 26 and the feet 14 of the frame each extend upon opposite sides of the frame for purpose of stability to the device and for the fisherman seated thereupon.

Upon the bracket 15 at the apex of the frame, a plurality of fishing rod holders 35 are secured, the holders 35 extending in a flared direction so that each of the holders can support an upwardly extending fishing rod 36. Thus the fisherman can free his hands while the fishing rod is in operative use during a fishing operation.

In operative use, the frame can be placed into the wading water 37 of a stream and the fisherman can rest his feet upon occasion by seating himself upon the saddle seat 19 and placing both his feet on the footrest 26. The tray 27 can be placed at any desired height so that it can support any object such as food or reading material.

Additionally, the tray can be used for preparation of the fisherman's tackle. While the fisherman thus rests, fishing rod 36 can be supported in the rod holders thus giving complete diversion to the fisherman.

It is to be noted that the portable fishing chair can be made in a regular model or a deluxe model and wherein it may include a fixed backrest 38 as part of the seat unit 18.

In FIG. 2, one form of backrest 39 is rearwardly tiltable to any desired degree so a fisherman may recline on it at any angle for best comfort; the device including a removable bracket 40 secured to bracket 21 and which includes ratchet teeth 41 for engaging a spring-urged pawl 42 attached pivotally to backrest post 43.

In FIG. 3, another form of backrest 44 is sidewardly tipped by means of the lower end of backrest post 45 being pivotable about a bolt 46 extending through flat plate 47 integral or attachable with modified design of bracket 21. The plate has an arcuate row of openings 48 through any one of which selectively a wingbolt 49 is receivable and threadingly attachable in a threaded opening 50 in the backrest post 45.

The backrest could be bought separately and attached to the fishing chair.

What I now claim is:

1. In a portable fishing chair, the combination of an A-frame, said A-frame including a pair of downwardly diverging legs, said legs being pivotally attached together at their apex upper end, and the lower end of said legs having self-contained means for maintaining said A-frame in an upright position when placed in wading water of a stream or body of water, and said frame supporting a seat upon which a fisherman may be seated, a leg rest upon which a fisherman may place his feet, and a tray upon which said fisherman can place objects such as food, tackle box, and reading material, as desired.

2. The combination as set forth in claim 1, wherein A-frame is comprised of tubular aluminum of square configuration, each of said legs of said A-frame having at its lower end a horizontally extending foot secured thereto, and the upper ends of said legs being attached pivotally free by means of a bracket secured fixedly to the upper end of one of said legs, said bracket including a pair of downwardly extending ears to form a channel therebetween within which the upper end of the other said leg is fitted, and a transverse extending pin is fitted through said ears of said bracket and the upper end of said other leg for pivotal relative movement of said legs.

3. The combination as set forth in claim 2, wherein said bracket is provided with a plurality of upwardly extending fishing rod holders in flaring position.

4. The combination as set forth in claim 3, wherein said seat unit is attachable to one of said legs, said seat unit including a saddle seat secured to a bracket provided with a pair of spaced-apart flanges with a channel therebetween for placement over said leg, said flanges being flexible toward each other for readily grasping said leg, and a bolt extending transversely through said flanges for clamping against said leg.

5. The combination as set forth in claim 4, wherein said tray and said leg rest are adjustably attached to the other said leg, said tray and said footrest each having a pair of spaced-apart ears with a channel therebetween for placement around said leg, and said ears being flexible for grasping said leg therebetween, and said ears having a bolt extending therethrough for securing said tray and said leg rest in a selected elevation.

6. The combination as set forth in claim 5, wherein said fishing chair includes a backrest attachable to said seat unit.

7. The combination as set forth in claim 6, wherein said chair is pivotally mounted to said seat unit to any selected inclination.

* * * * *